INVENTOR.
NIKOLA TRBOJEVICH
BY Whittemore Hulbert
Whittemore & Belknap
ATTORNEYS Patented Feb. 11, 1930

1,747,091

UNITED STATES PATENT OFFICE

NIKOLA TRBOJEVICH, OF HIGHLAND PARK, MICHIGAN

INTERNAL-COMBUSTION ENGINE

Application filed August 9, 1926. Serial No. 127,998.

This invention relates to a novel internal combustion engine of the reciprocating type and a thermal cycle of combustion capable of being performed by said engine.

The peculiarity of this engine consists in the fact that both the length of stroke and the ratio of compression are variable and further that said variation is continuously and automatically performed by the engine itself in the course of its running. In particular, at starting or at slow speeds the displacement and the compression are at their minimum and from then on both of said quantities increase with the increase of the inertial pressures of the reciprocating parts, i. e., with the increase of the speed of the engine.

The novelty of the mechanism resides principally in the improved crank mechanism employed in which a connecting rod of a special construction is used having the property that it may under certain conditions either stretch out or contract within comparatively small limits and thus alter the displacement or the compression of the engine. In addition, the rod serves as a shock absorber of the engine.

The invention is applicable to the Otto, Diesel and the intermediate cycles whether operating in four or two strokes. It also may operate according to a novel cycle forming the subject matter of this invention, the percussion cycle as I shall briefly call it, in which cycle the charge is ignited by a hammerlike blow of the piston and in which the force of the thus started detonation is immediately reduced and checked by the instantaneous rebound of said piston.

The object of this invention is to produce an engine that is capable of running at high rotative speeds and at low fuel consumption. Another object is to have an engine that is fundamentally a high compression engine and yet will have a low compression (and an easy start) at the low or starting speeds. Still another object is to insure the scavenging of burnt gases at the end of the expansion stroke and thus to insure a low suction temperature combined with a degree of supercharging. With these and other objects in view the invention will now be explained in detail.

Figure 1:
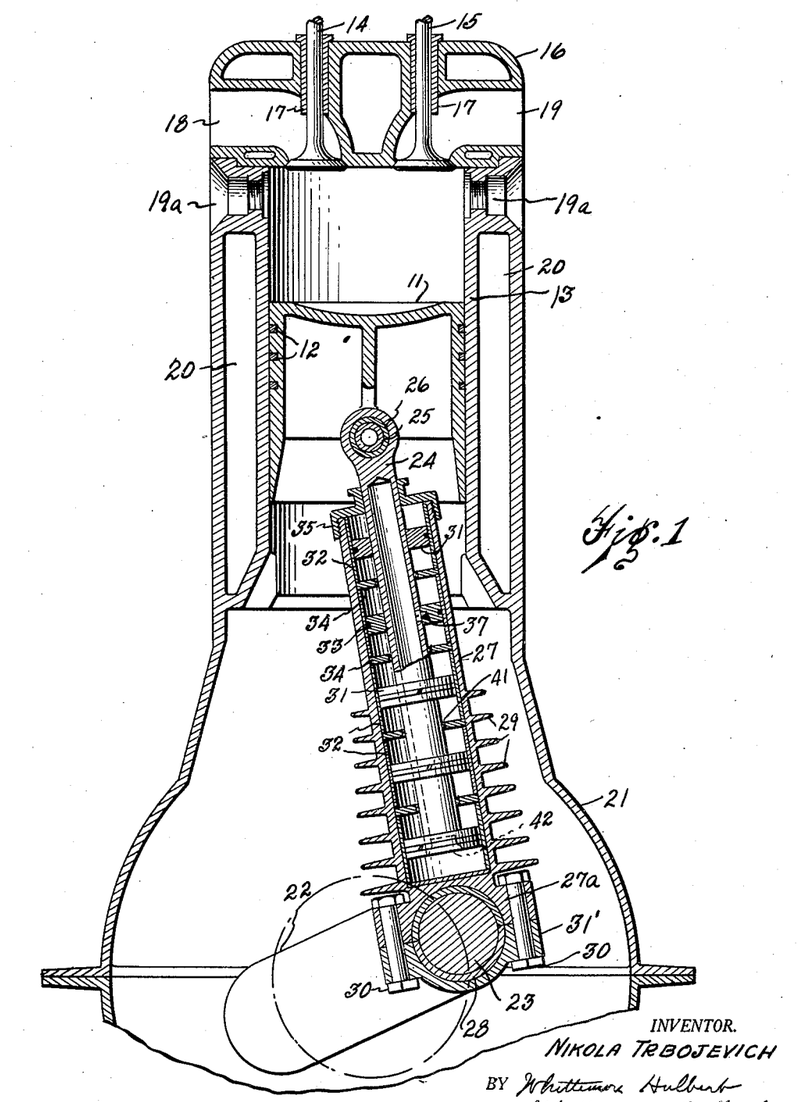
Figure 1 is a sectional elevation of a typical engine embodying my invention.

Referring now to Fig. 1, showing the sectional elevation of the engine, it is seen that the main difference between this and an ordinary engine lies in the form of the connecting rod.

The piston 11 which is provided with several suitable piston rings 12 reciprocates in the water-cooled and smoothly finished cylinder 13. Two overhead valves are employed, the inlet valve 14 and the exhaust valve 15, both of which may reciprocate along their respective axes in the water-cooled cylinder head 16 and in the sleeves 17. The inlet and outlet passages 18 and 19 respectively are also water-cooled and proportioned in the customary manner. Two spark plugs may be inserted in the holes 19ª. Integral with the cylinder 13 are the water jackets 20 and the upper half of the crank case 21. The crank shaft 22 is rotatably mounted in its bearings concentric with the crank case and carries a plurality of crank pins 23 (one for each cylinder) in the usual way.

The connecting rod (compare also with Figs. 2 and 3) consists of two relatively movable parts, the spindle 24 rotatably mounted upon the wrist pin 25 by means of an antifriction bushing 26, and the sleeve 27 rotatably mounted upon the crank pin by means of the split bushing 28. The upper part of the spindle 24 is formed in a ring tightly fitting over the bushing 26, while its lower part is cylindrical and preferably drilled out as shown in the drawing to reduce its weight. The sleeve 27 is similar to an automobile cylinder and is made as light and strong as practicable. The fins 29 serve to dissipate the heat generated within said sleeve and are preferably integral with said sleeve. The lower part of the sleeve 27 is formed in a half circular bearing 27ª and is bolted by means of bolts 30 to the complementary half bearing 31′.

Figures 2, 8:
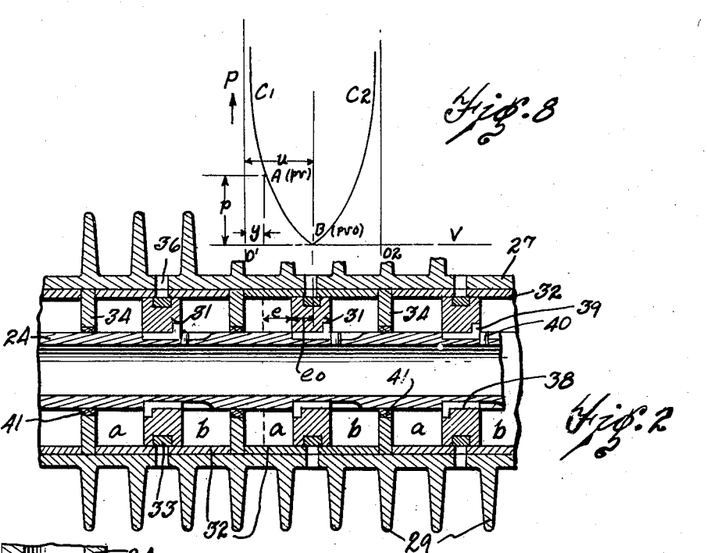
Fig. 2 is an enlarged sectional view of my improved connecting rod such as is shown in Fig. 1, designed to operate with compressed air.
Fig. 8 is a pressure volume diagram, explanatory of the action of the connecting rod shown in Fig. 2.

In the cylindrical bore of the sleeve a plurality of compressor pistons 31 are fitted with an air-tight fit to reciprocate in the corresponding smoothly finished cylinder linings 32. The compressor pistons are equally spaced on the spindle 24 and keyed thereto. Each compressor piston 31 is provided with one or more piston rings 33. The linings 32 are separated from each other by the spacers 34 which are flat circular rings and serve to divide the contents of the cylindrical bore of the sleeve into a series of air-tight compartments and for this reason have an air-tight fit over the spindle 24. The compressor pistons are normally arranged midway between the spacers 34 thereby sealing the vent ports 36 in the cylinder and linings and forming on opposite sides of the pistons the compartments $a$ and $b$ respectively. The topmost compartment is closed by the cap 35 screwed over the sleeve 27 and snugly fitting over the spindle 24.

The principle of action of the new connecting rod will now be explained. Referring to Fig. 2, when the spindle 24 carrying the compressor pistons 31 is pulled to the left (the sleeve 27 remaining stationary) the air in the compartments $a$ will be compressed adiabatically, and when pulled to the right, the same will happen in the compartments $b$. Thus the rod may be elongated by applying a certain force an amount equal to the distance $e$ and it may be shortened the same amount by reversing the direction of said force. It is also to be noted that the rod resists such elongation or abbreviation with an ever increasing resistance and it would require an infinite force (theoretically) to bring the piston 31 in contact with the spacer 34.

The method of calculation is as follows: First we shall determine the magnitude of force that is required to produce in the rod an elongation $e$, and then we shall determine the amount of elongation necessary to produce the desired change of displacement and the ratio of compression in the engine cylinder. These two results then taken together will give us a basis for designing the connecting rod to fit any particular engine.

Looking now at the $pv$ (pressure-volume) diagram in Fig. 8, the elongation of the rod corresponding to $e$ will also correspond to the point A on the pressure curve $c_1$. The pressure $p$ at the point A may be calculated from the well known equation relating to the adiabatic changes of an ideal gas:

$$p = po\left(\frac{v_o}{v}\right)^k \quad (1)$$

where $po$ and $v_o$ are the initial pressure and volume at the point B, and $pv$ are the same quantities at the point A. The value of the adiabatic constant $k$ is equal to 1.41 (for dry air).

Expressing the Equation 1 in pounds per square inch, we have:

$$p = 14.7\left(\frac{u}{y}\right)1.41 \quad (2)$$

where
$$y = u - e - e_o \quad (3)$$

$e_o$ being the distance of the face of the compressor piston 31 from the air vent 36, i. e. the point where the air pressure is equal to one atmosphere 14.7 lbs.

In order to find the total compressing force corresponding to the change of length $e$, the pressure $p$ from the Equation 2 must be multiplied by the number of compressor pistons and the effective area of each piston. Thus when five compartments are employed, each compartment will carry only one fifth of the total pressure required. It is, therefore, advantageous to have as many compartments as possible in the connecting rod and on some heavy duty Diesel engines I intend to employ as many as thirty compartments.

Before proceeding with the calculation of the required lengths of the elongations $e$ in different cases, we shall complete the description of the mechanical details shown in Figs. 1 to 7.

The compressor pistons 31 must be securely bolted to the spindle 24. This may be done either by means of a screw 37 as shown in Fig. 1, or by means of keys 38 and 39 and a rivet 40 as shown in detail in Fig. 3. In order to obtain an air tight fit between the spindle 24 and the spacers 34 and also to reduce the friction, one accurately machined bushing 41 is pressed in each of those spacers. The opening of the drilled out hole in the stem of the spindle 24 is closed by means of the plug 42, Fig. 1.

The method of manufacturing and assembling the new connecting rod is the following. After all parts have been accurately machined the spindle 24 is first built up by placing on it first the cap 35 then keying to it the first compressor piston 31, then placing the cylinder lining 32 over it and completing the first compartment by the addition of the spacer 34. In such a manner the spindle assembly is built up, one compartment after the other, and the whole assembly is placed into the sleeve 27 and the cap 35 is screwed on.

All the auxiliary apparatus and parts of the engine in Fig. 1 such as the carburetor, ignition devices, flywheel, timing gear, camshaft, radiator, oil pump etc. are the same as in any standard engine and therefore are not illustrated. Regarding the valves and the form of combustion chamber it should be noted that overhead valve arrangement is preferred on account of high and variable compressions employed. However, sleeve valves or a Ricardo head can be employed if desired.

Figure 3:
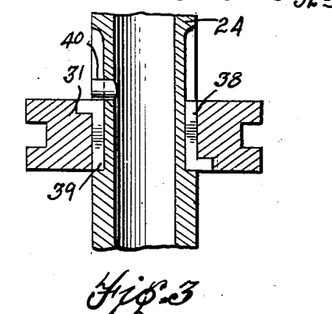
Fig. 3 shows a method of fastening the air plunger upon the connecting rod spindle shown in Figs. 1 and 2.
Figure 4:
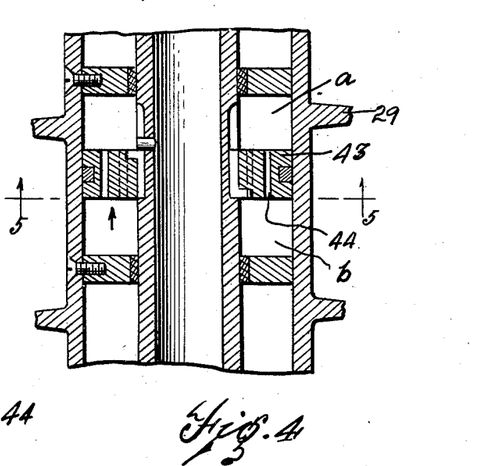
Fig. 4 is a fragmentary longitudinal section of a modified form of connecting rod utilizing oil pressure.
Figure 5:
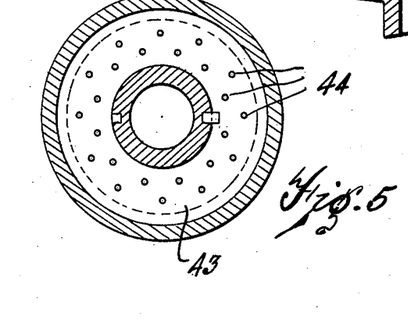
Fig. 5 is a transverse section on line 5—5 of Fig. 4.

The preferred medium to produce a gradual and elastic compression and expansion in my connecting rod is air, Figs. 1 to 3. A modification employing oil dash pots is shown in Figs. 4 and 5. The compressor piston 43 is drilled through with many minuted openings or pores 44 to provide for the escape of the oil from the chamber $a$ to the chamber $b$ when said compressor piston is pushed in the direction of the arrow. Thus a resistance to reciprocation is created which resistance may be adjusted to any predetermined figure by suitably selecting the number and dimensions of the pores 44.

Figure 6:
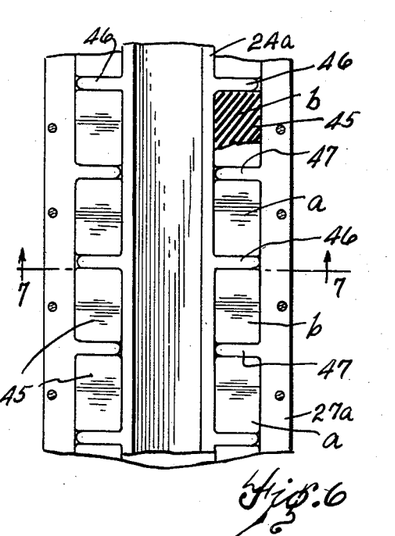
Fig. 6 is a fragmentary longitudinal section of another modified connecting rod employing yielding members of rubber.
Figure 7:
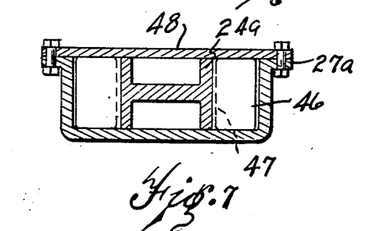
Fig. 7 is a transverse section on line 7—7 of Fig. 6.

In Figures 6 and 7 is shown a portion of a connecting rod in which a plurality of rubber pads 45 are employed as a yielding element. The spindle $24^a$ is now a forged steel beam of an I section carrying a plurality of equally spaced prongs 46 on its either side. The sleeve $27^a$ is a member of U shaped cross section having a number of equi-spaced prongs 47 extending inside. The rubber pads are placed preferably with a slight initial compression in the compartments $a$ and $b$ between the corresponding prongs 46 and 47. It is seen that if a sufficient number of such pads is employed, very considerable forces may be transmitted as the total force is divided among said pads. The cover 48 is placed over the compartments in order to protect the rubber pads from the incoming oil, dirt etc.

The new cycle

Figure 9:
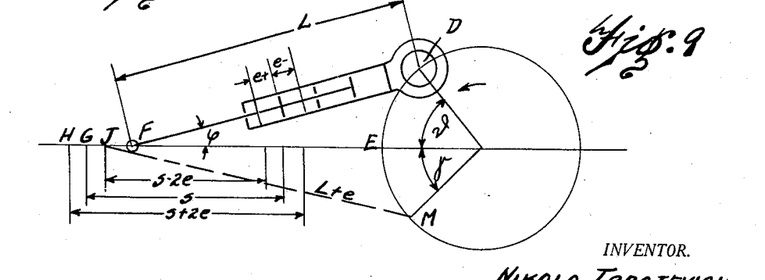
Fig. 9 is a diagram of the crank mechanism.

The characteristic feature of the engine of this type is that it behaves in an entirely different manner at slow speeds from that at high speeds. In Fig. 9 the novel crank mechanism is diagrammatically shown. As the length of the connecting rod (the medium or normal length of which is L) may become either $L+e$ of $L-e$ depending on whether it is expanded or compressed, it follows that the length of the stroke may vary between the limits $S+2e$ and $S-2e$, $S$ being the medium length of stroke corresponding to the connecting rod length L.

Suppose now that while the crank $r$ is describing the angle $\vartheta$ from D to E, (the so called "in-stroke") the length of the rod increases by a distance $GH=e$, and on the out-stroke decreases the same amount. This will produce the long stroke $S+2e$. A short stroke $S-2e$ will be produced if the rod contracts on the in-stroke, and expands on the out-stroke.

Let us now analyze the movement at slow speeds. Disregarding first the fluid pressures in the engine cylinder at the various phases of the cycle, it is readily seen that the friction resistance of the engine piston alone is sufficient to contract the connecting rod on its in-stroke and to expand it on the out-stroke. Thus, on the instroke, the end of the rod F arrives at the point J in a contracted condition, i. e. having a length $L-e$. At this position the piston will dwell until the crank has moved from E to M through an angle $\gamma$ corresponding to the expanded length of the rod $JM=L+e$. On the out-stroke the connecting rod is in the expanded condition and will change again into a shortened length at the lower dead-center. This crank movement as far as I am aware is new in the art, its peculiarity being that the piston after arriving at the dead point dwells there through a crank angle $\gamma$, before assuming its return stroke.

Figure 10:
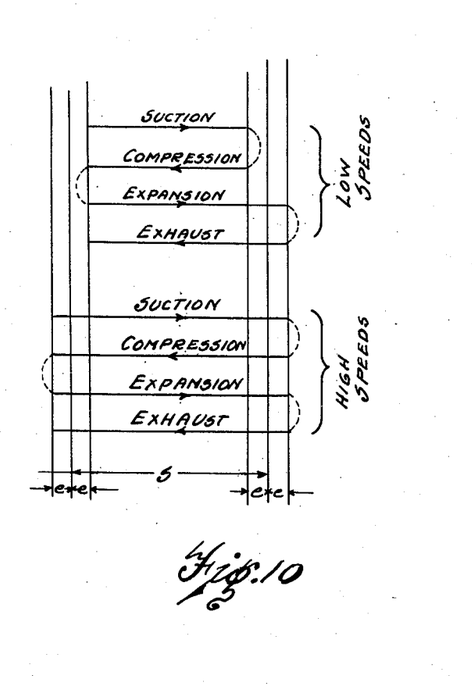
Fig. 10 is a diagram illustrating the variation in the length of the piston stroke in the cycle of the engine

When there are fluid pressures in the engine cylinder as for instance during the compression and the expansion strokes, the behavior of the connecting rod will correspondingly change as is diagrammatically shown in the upper part of Fig. 10. The fluid pressure while it lasts will tend to maintain the connecting rod in a contracted position. For this reason the length of the expansion and the exhaust strokes will be in that case equal to S instead of $S-2e$, i. e. they will be longer than the corresponding suction and compression strokes. Furthermore, there will be no dwelling of the piston during the period of combustion.

Coming now to the analysis of the motion at high speeds we find that the most important factor to be considered is the momentary inertia pressure created by the variable speed of the piston, and its mass. The equations from which these inertia pressures may be calculated are well known and are determined by differentiating the (variable) piston velocity with respect to time, and by multiplying the result thus obtained by the mass of the piston. In particular:

$$C_p = C_o \left( \sin \vartheta + \frac{r}{2L} \sin 2\vartheta \right) \quad (4)$$

Equation 4 gives the piston velocity $c_p$ in the terms of the crank pin velocity $c_o$ and other quantities, the value of which may be ascertained from Fig. 9. The acceleration of the piston is obtained by forming the differential of the Equation 4 with respect to time $t$ as follows:

$$\frac{dc_p}{dt} = \frac{C_o^2}{r} \left( \cos \vartheta + \frac{r}{L} \cos 2\vartheta \right) \quad (5)$$

In the Equation 5 the expression in paranthesis at the right side of said equation is what is usually termed the crank factor $f_a$ $$f_a = \cos \vartheta + \frac{r}{L} \cos 2\vartheta \quad (6)$$

By multiplying the acceleration found in the Equation 5 with the mass of the piston (the weight W divided by the gravity constant $g$), we have for the value of the inertia force F $$F = \frac{W}{g} \frac{C_o^2}{r} f_a \quad (7)$$

or simplified $$F = 0.000028 \, W n^2 r f_a \quad (8)$$

where $n$ is the number of revolutions per minute of the engine, and $r$ is the crank radius in inches, thus giving the inertia force in pounds.

Thus, from the Equations 4 to 8 incl. the dynamic laws governing the magnitude and variations of the inertia forces may be summarized. The Equations 7 and 8 tell us that the inertia force is in direct proportion with the mass (or weight) of the piston and also in direct proportion with the momentary value of the crank factor $f_a$; on the other hand, said force increases with the square of the engine speed. The Equations 4 to 6 tell us that the inertia force, similarly to the piston velocity, fluctuates roughly according to the sine law since the value of the disturbing factor (the last member in the Equations 4 and 5) is comparatively small. Further, the inertia force lags in phase 90 degrees behind the piston velocity, i. e. when the piston velocity is at its maximum, the inertia force will be equal to zero and as the piston velocity decreases in value, the inertia force increases until it reaches its maximum at each dead point of the stroke. The interesting part of this variation is that when the crank is in the position at D, and continues to advance in the direction of the arrow (Fig. 9), the piston tends to fly off in the direction of tangent thus pulling the crank with an ever increasing force. When the dead point is reached, the condition will be reversed in a certain sense in that now the crank will pull the piston. It is to be noted, however, that whether the crank is doing the pulling or is being pulled, it will make no difference as far as the state of the connecting rod is concerned, as that member being subject to tension, will elongate, said elongation being in each instant of approximately such magnitude as to balance (through its resistance against elongation) the momentary tensile forces.

In the neighborhood of the out-center, the conditions will be just reversed in that the connecting rod will be subjected to a compression by variable inertia force. Thus it is seen that the peculiarity of this dynamic law forms the basis of this invention as it enables me to construct a variable stroke and variable compression engine by inserting a yielding member between the piston and the crank shaft.

Figures 13, 14, 15:
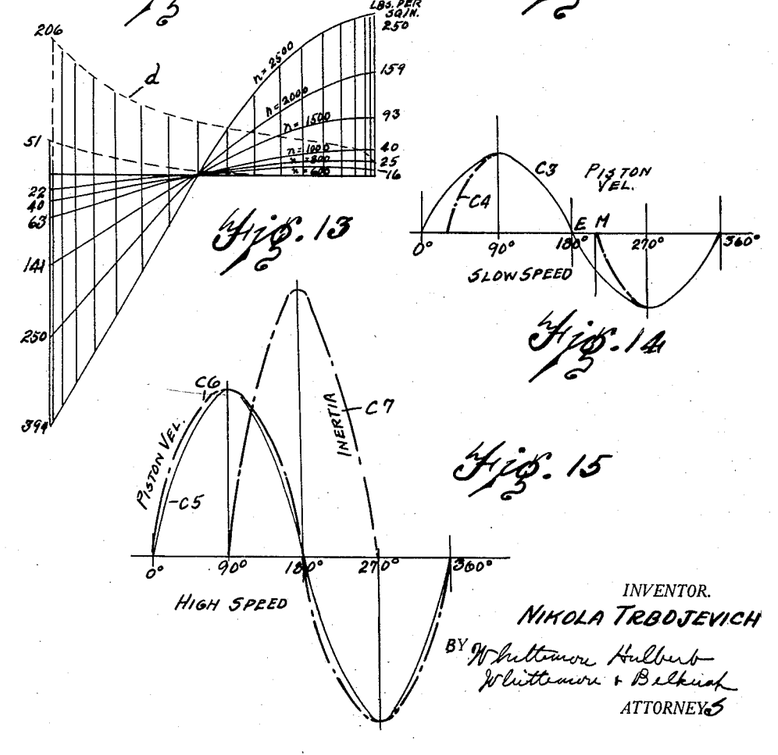
Fig. 13 is a diagram showing a series of inertia curves.
Fig. 14 is a graph of the piston velocities at slow engine speeds.
Fig. 15 is a graph of the piston velocities at high engine speeds.

Fig. 10 schematically shows that the length of stroke at high speeds is equal to $S + 2e$. The piston velocities at slow and high speeds are treated in Figs. 14 and 15. In Figs. 14, $c_3$ is the piston velocity curve of an ordinary engine while the curve $c_4$ illustrates the same relation in the new engine. It will be seen that the period of dwelling is the distance EM corresponding to the dwelling angle $\gamma$ in Fig. 9.

In Figure 15 which illustrates the velocity conditions at high speeds it will be seen that the new piston velocity curve is substantially of the same general form as is the conventional velocity curve $c_5$. It is interesting to note that in the new engine, although the path of piston travel is increased by a distance $2e$, the maximum velocity of the piston is not increased thereby as the additional ground covered by the piston is done in the neighborhood of each point, i. e. at slow speed. The curve $c_7$ in Fig. 14 represents the inertia force F at a suitable scale. As was already stated, said force lags in phase ninety degrees behind the piston velocity.

In high speed engines the inertia forces usually reach a considerable magnitude in spite of all efforts exerted on the part of designers to reduce the reciprocating weight to a minimum. Thus, in the neighborhood of 1500 R. P. M. the inertia force is usually greater than the compression pressure and at 2500 R. P. M. it exceeds the explosion pressure. A series of inertia curves are drawn to scale in Fig. 13 with the indicator diagram $d$ of the corresponding engine superposed in the same scale. The inertia forces at the six different velocities ranging from 600 to 2500 R. P. M. were computed in the form of inertia pressures reduced upon each square inch of the piston area in order to facilitate their comparison with the simultaneous fluid pressures. The weight of the piston has been assumed equal to 0.66 lbs. per square inch of the piston area.

Figure 11:
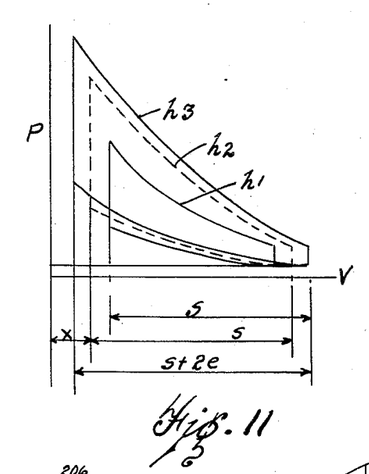
Fig. 11 represents a series of pressure volume diagrams.

It remains now to calculate the variation of the compression for the different values of stroke increments $e$. From Fig. 11 it is seen that the medium ratio of compression $R_m$ is equal to:

$$R_m = \frac{\gamma + x}{x} \quad (9)$$

where $x$ is the length of the combustion chamber reduced to the diameter of the piston or cylinder.

Let the maximum ratio of compression be denoted with $R_2$ and the minimum ratio with $R_1$. We have then $$R_2 = \frac{\gamma + x + e}{x - e} \quad (10)$$

$$R_1 = \frac{\gamma + x - e}{x + e} \quad (11)$$

From the above three Equations 9 to 11 the quantities R and $x$ may be eliminated leaving the following relation for $e$:

$$e = \gamma \frac{R_2 - R_1}{2(R_2 R_1 - 1)} \quad (12)$$

To illustrate the meaning of the formula just derived with a numerical example: Let the minimum ratio of compression of a certain engine having a 4 inch stroke be 4, and the maximum ratio 15. Find the values $e$, $x$ and $R_m$.

From the Equation 12, $e = .373''$. By substituting the value of $e$ in either one of the Equations 10 and 11, and solving for $x$, we have: $x = .712''$, and the value of $R_m$ from the Equation 9 will be: $R_m = 6.619$.

The above numerical results prove that the execution of my invention is well within practicable limits as the connecting rod has to expand or contract less than ⅜ of an inch. In a connecting rod 10 inches long that means less than 4 per cent of the total length of the rod.

At high speeds the displacement increases also. In the above example it will be found that the displacement of the engine is 46 per cent greater at high than at slow speeds, or in other words the engine possesses a 46 per cent supercharge.

It must be considered as an advantage in this engine that the cubic displacement increases with the rotative speed. When the engine is used for propulsion of a vehicle or an airship, the resistance to motion increases with the square of the speed while the horsepower increases only linearly with the speed resulting in the well known fact that all such engines that are capable of attaining a high road speed are as a rule too large and too wasteful of fuel at the ordinary driving speeds.

In Figure 11 three indicator diagrams are shown somewhat exaggeratedly. The high and the slow speed cards are the $h_3$ and $h_1$ respectively while the card $h_2$ represents the conditions obtaining in an ordinary engine where the stroke and ratio of compression are not variable.

We may now summarize the results obtained:

(1) As the speed of the engine is increased, the inertia forces of the reciprocating parts come into play and from a certain speed on they are of a sufficient magnitude to compress the charge without any help on the part of the crank shaft. In order to do this, said forces must be greater than the sum of the fluid pressure in the connecting rod, the fluid pressure in the cylinder and the frictional resistance in the connecting rod and the cylinder.

Figure 12:
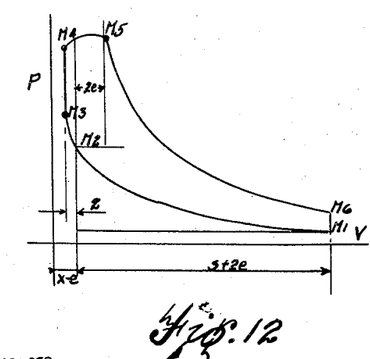
Fig. 12 represents a pressure volume diagram of the new percussion cycle.

(2) If the speed of the engine is still further increased, a point may be reached at which the compression will be so high as to cause the charge to ignite by itself. This is not particularly harmful in this engine because at such extraordinarily high speeds the time available for combustion is so short that a full detonation cannot take place in less time than it takes for the piston to rebound through a distance $2e$. On the other hand this "percussion cycle" is very useful first because it enables us to shut the ignition off and have the more dependable mechanical firing, and second, because this cycle gives the highest imaginable thermal efficiency with a volatile fuel. It also renders possible the use of very lean mixtures. Fig. 12 shows such a percussion cycle in the form of a $p$, $v$ diagram. Starting the compression stroke at $M_1$ the compression would be ordinarily carried up to the point $M_2$ corresponding to an elongation $e$. However, the piston is carried by the excessive inertia forces a distance $z$ past that point as far as the point $M_3$, where the self-ignition occurs. The pressure suddenly rises from $M_3$ to $M_4$ by which time the piston inertia is overcome by said increase in pressure and the connecting rod is thus enabled to spring back in its initial length. From $M_4$ to $M_5$ the combustion is approximately at constant pressure similar to a Diesel cycle after which the charge is adiabatically expanded down to the point $M_6$.

(3) This invention is also easily adapted to the Diesel cycle and may render possible the construction of such engines running at higher speeds than at present. As it is well known the volumetric efficiency decreases as the speed is increased and if the ratio of compression is fixed, it means that the compression pressure is reduced at high speeds. In my engine the ratio of compression is increased with the increased speed which evidently makes it possible so to proportion the dimensions that the loss of volumetric efficiency will be compensated with an increased ratio of compression. In such a case the compression pressures may be kept constant and the firing will be just as dependable at high speeds as it is now at low speeds. In addition, by the use of variable compression the starting of the Diesel engine is simplified as the engine may be run according to the Otto cycle (by using a volatile fuel and artificial ignition) until the proper operating speed has been reached, and then switched over to self ignition and heavy fuel.

(4) The principles of design of the new engine have now been fully covered, it is believed. It should be noted that the compression compartments in the connecting rod should be so designed that the piston in no case will strike the valves or the top of the cylinder. It is always possible to do so because the distance $e$ is only about one half of the distance $x$ even for such high compressions as fifteen to one, (see the Equs. 9 to 12).

It is to be understood that certain features of my invention are not necessarily limited to internal combustion engines but are also applicable to other reciprocating engines employing a piston, crank and connecting rod. Thus the novel form of connecting rod may be advantageously used in compressors or other mechanism in order to act as a shock absorber.

What I claim as my invention is:

1. In a reciprocating engine, the combination with a cylinder, a piston and a crank, of a connecting rod comprising two relatively movable members connected to said piston and crank respectively, one of said members being provided with a plurality of compartments and the other being provided with a plurality of projecting portions arranged within the respective compartments, and means in each compartment co-operating with the respective projecting portions for yieldably resisting the relative longitudinal movement of said members within predetermined limits.

2. In an internal combustion engine, a connecting rod consisting of two spaced telescoping members, one being divided into a series of chambers containing a yielding medium, and means arranged upon the other of said members and positioned in said chambers for dividing the same into a series of compartments, said means being operable upon tensioning the rod to serially compress the media in certain of said compartments and to serially expand the media in certain other of said compartments until the sum of the serial forces thus generated balances the tensile force, the maximum elongation of the rod being predetermined with regard to the speed of the engine and the weight of the reciprocating parts to obtain the desired compression.

3. In an internal combustion engine, a connecting rod consisting of a pair of telescoping members, one being provided with a plurality of groups of compartments filled with an elastic medium and means operable to compress the media in one group of the compartments to resist the tensioning of the rod with an ever increasing force substantially according to the adiabatic law, said means being similarly operable to compress the media in a second group of compartments to resist the compression of the rod, said compartments being so designed as to cooperate with each other in such a manner that each compartment will carry only a fractional part of the total load transmitted.

4. In an internal combustion engine, a connecting rod consisting of two telescoping members one of which having a plurality of projections cooperating with the other of said members to divide the same into a plurality of compartments, said compartments being filled with an elastic medium compressible and expandible by said projections substantially according to the adiabatic law for the purpose of elastically yielding to outer compressing and tensile forces at all times, said parts being so designed as to never elongate or contract beyond a certain predetermined limit.

5. In an internal combustion engine, a connecting rod consisting of two telescoping members, one having a plurality of projections cooperating with the other of said members to form a plurality of compartments filled with an elastic medium, said projections being operable to contract and expand the media substantially according to the adiabatic law in which the compartments are so arranged that the elastic matter in each compartment carries only a fractional part of the total load transmitted through said connecting rod.

6. An internal combustion engine of the reciprocating type having a telescoping connecting rod and a plurality of parallel connected compartments therein, said compartments being arranged in two series and filled with an elastic medium contracting and expanding substantially according to the adiabatic law for the purpose of providing a yielding resistance in either direction to forces however large or small and yet never exceeding in elongation and contraction beyond a predetermined limit.

7. In an internal combustion engine, a connecting rod consisting of two telescoping members forming a plurality of groups of compartments filled with elastic medium, one group resisting the elongation and the other the compression along the axis of the rod and so arranged that each group carries only a fractional part of the total load and the elongation and compression approach a predetermined and definite limit when the acting forces are indefinitely increased.

8. A telescoping connecting rod consisting of a member provided with a plurality of pistons arranged about a common axis, a member provided with a plurality of compartments cooperating with said pistons, and means for automatically replenishing the air supply in said compartments whenever the oscillations of the telescoping member exceed a certain predetermined amplitude.

9. In a telescoping connecting rod, the combination of a member carrying a plurality of plungers, a member comprising a plurality of comparements cooperating with said plungers, and means for equalizing the initial air pressure in each compartment by periodically opening and closing a plurality of ports at the end of each oscillation.

In testimony whereof I affix my signature.

NIKOLA TRBOJEVICH.